(12) United States Patent
Ambar et al.

(10) Patent No.: US 11,372,344 B2
(45) Date of Patent: Jun. 28, 2022

(54) CONTROLLING SCAN-TO-SCAN SPACING BETWEEN PRINT OPERATIONS

(71) Applicant: HP Indigo B.V., Amstelveen (NL)

(72) Inventors: Oron Ambar, Ness Ziona (IL); Vladimir Shalmai, Ness Ziona (IL); Haim Vladomirski, Ness Ziona (IL)

(73) Assignee: HP Indigo B.V., Amstelveen (NL)

( * ) Notice: Subject to any disclaimer, the term of this patent is extended or adjusted under 35 U.S.C. 154(b) by 602 days.

(21) Appl. No.: 16/332,460

(22) PCT Filed: Oct. 10, 2016

(86) PCT No.: PCT/EP2016/074246
§ 371 (c)(1),
(2) Date: Mar. 12, 2019

(87) PCT Pub. No.: WO2018/068822
PCT Pub. Date: Apr. 19, 2018

(65) Prior Publication Data
US 2021/0286285 A1 Sep. 16, 2021

(51) Int. Cl.
*G03G 15/04* (2006.01)
*G02B 26/12* (2006.01)
(Continued)

(52) U.S. Cl.
CPC ......... *G03G 15/043* (2013.01); *G02B 26/105* (2013.01); *G02B 26/123* (2013.01)

(58) Field of Classification Search
CPC ............. G03G 15/04; G03G 15/04072; G03G 15/0415; G03G 15/043; G02B 26/105; G02B 26/12; G02B 26/123
See application file for complete search history.

(56) References Cited

U.S. PATENT DOCUMENTS 5,760,817 A 6/1998 Foote et al.
6,057,867 A 5/2000 Chan et al.
(Continued)

FOREIGN PATENT DOCUMENTS

EP 1148993 A1 10/2001
EP 2597527 5/2013
(Continued)

OTHER PUBLICATIONS

Cheng H et al., Modeling and Control of Piezoelectric Cantilever Beam Micro-mirror and Micro-laser Arrays to Reduce Image Banding in Electrophotographic Processes, Jul. 19, 2001, https://engineering.purdue.edu/~gchiu/Papers/2001/JMM_Micro_Beam_Deflection_Arrary_Cheng_Ewe_Bashir.pdf >.

*Primary Examiner* — Sophia S Chen
(74) *Attorney, Agent, or Firm* — Mannava & Kang

(57) ABSTRACT

In an example, a method includes determining a first scaling to be applied to a first print operation and a second scaling to be applied to a second print operation. Each print operation includes selectively removing charge from a charged photoconductor by irradiating the photoconductor in a plurality of scans, forming a first print agent pattern on the photoconductor and delivering the first print agent pattern to a substrate. If the first and second scalings are different, a control instruction may be determined to change the scan-to-scan spacing between the first and second print operations.

15 Claims, 6 Drawing Sheets

(51) Int. Cl.
    *G03G 15/043*     (2006.01)
    *G02B 26/10*     (2006.01)

(56) References Cited

U.S. PATENT DOCUMENTS

| | | |
|---|---|---|
| 7,542,200 B1 | 6/2009 | Stowe |
| 8,393,714 B2 | 3/2013 | Silverbrook |
| 8,587,625 B2 | 11/2013 | Keithley |
| 2006/0202116 A1 | 9/2006 | Koga et al. |
| 2011/0298884 A1 | 12/2011 | Furuta |
| 2017/0060020 A1* | 3/2017 | Ikari .................... G03G 15/043 |

FOREIGN PATENT DOCUMENTS

| | | |
|---|---|---|
| EP | 1723460 A1 | 11/2016 |
| JP | 05254176 | 10/1993 |
| WO | WO-0043206 | 7/2000 |

\* cited by examiner

CONTROLLING SCAN-TO-SCAN SPACING BETWEEN PRINT OPERATIONS

BACKGROUND

In some print apparatus, a pattern of print agent such as toner or ink is applied to at least one surface. In some such examples, a photoconductive surface may be charged with static charge and a light source, for example a laser light source, is used to dissipate the static charge in selected portions of the photoconductive surface to leave a latent electrostatic image. The latent electrostatic image is an electrostatic charge pattern representing a pattern to be printed. An electrostatic print agent (for example, a toner, or an ink comprising electrically charged particles) may be applied to the photoconductive surface. The electrostatic print agent attracted to the latent electrostatic image on the surface and forms a pattern on the surface of the latent electrostatic image. This pattern may be formed on or transferred to (in some examples, via an intermediate transfer member (ITM)) a print substrate.

BRIEF DESCRIPTION OF DRAWINGS

Non-limiting examples will now be described with reference to the accompanying drawings, in which.

DETAILED DESCRIPTION

In printing, print agents such as inks or toners may be applied to a substrates. Substrates may in principle comprise any material, for example comprising paper, card, plastics, fabrics or the like.

In some printing processes, substrates can be subject to pressures or heat which may cause them to deform, for example to stretch or shrink. This may be particularly prevalent in some substrates such as plastics (for example polypropylene), and deformation may vary between substrates.

In some print apparatus, a pattern of print agent such as toner or ink is applied to at least one pattern receiving surface prior to being transferred to a substrate. In such cases, a number of print agent patterns, termed 'separations', for example comprising different inks or toners of colors, may be built up on a pattern receiving surface before being applied to the substrate (so called 'one-shot' printing mode), while in other examples, separations may be applied to the substrate individually (so-called 'multi-shot' printing mode). In some cases, the substrate can deform between separations, for example stretching more with each separation as heat builds up. For example, as the substrate may roll between the hot drums over a number of separations, it may stretch or shrink in the paper transport direction (generally referred to as the 'vertical' direction) which may cause each separation to have different vertical scaling which can for example lead to vertical separation plane registration errors.

In order to compensate for deformations in a substrate, an image may be scaled. For example, a print apparatus' nominal vertical scaling can be adjusted by varying the speed of a drum bearing a pattern receiving surface on which an image may be formed, varying the speed at which an imaging pattern is written to a photoconductive surface, varying an optical zoom, or the like. However, such methods may take around 5 seconds or more to implement, which may be excessive in the context and can have other adverse effects on a printed image. In some examples, some substrates may not be selected for printing on the basis that the deformation thereof prevents generation of images with a satisfactory image quality.

Figure 1:
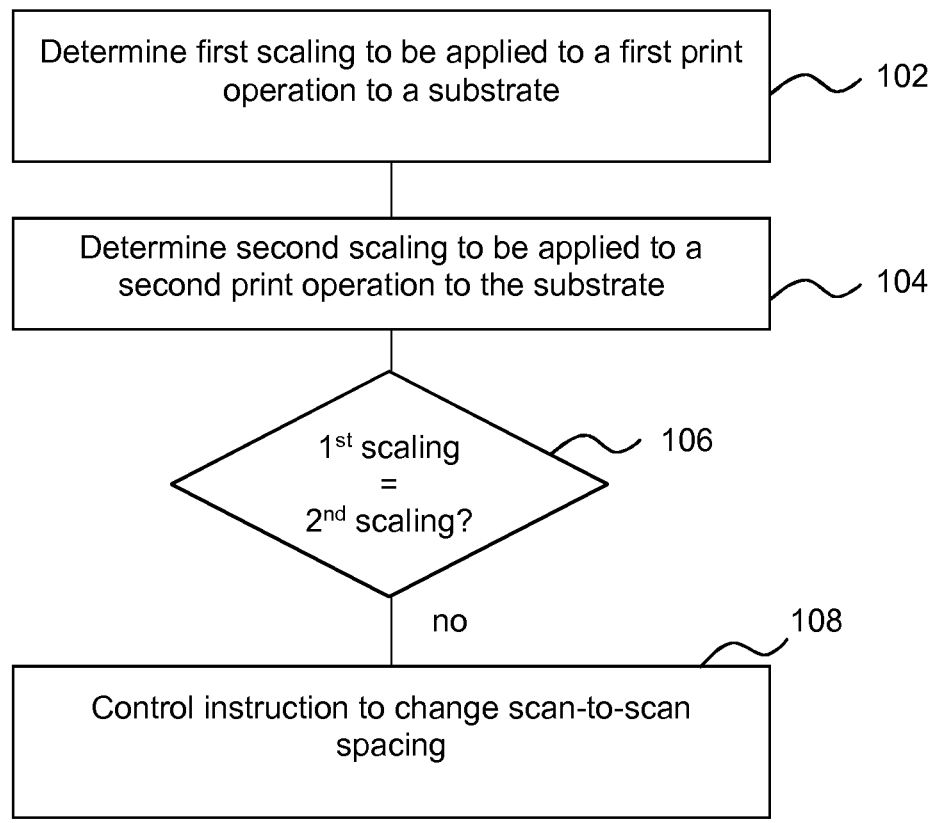
FIG. 1 is a flowchart of an example method of controlling scan-to-scan spacing in a print apparatus.

FIG. 1 is an example, which may be a method of compensating for a change in scaling of a printed image, and/or a method of compensating for substrate deformation in printing. Block 102 comprises determining a first scaling to be applied to a first print operation. The first print operation comprises selectively removing charge from a charged photoconductor by irradiating the photoconductor in a plurality of scans, forming a first print agent pattern on the photoconductor and delivering the first print agent pattern to a substrate. The scaling may be indicative of a substrate dimension, of a change in at least one substrate dimension, and/or in some examples is indicative of a change in a length of an image size or substrate. In some examples, the scaling may be a nominal scaling for un-deformed substrates, and a departure from the nominal scaling where deformation is anticipated or has occurred. Block 104 comprises determining a second scaling to be applied to a second print operation. The second print operation comprising selectively removing charge from the photoconductor by irradiating the photoconductor in a plurality of scans, forming a second print agent pattern on the photoconductor and delivering the second print agent pattern to the same substrate as for the first print operation. In other words, the first and second print operations may comprise print operations relating to first and second print separations.

Scanning beams of light from the array of light sources across a charged photoconductor to selectively remove charge from the charged photoconductor may be carried out according to an intended printed pattern of print agent. Each scan may result in the charge being selectively removed from a region, or swath, of the photoconductor. The regions may be at least substantially different (although, as noted below, some overlap may occur in some examples). The method may comprise applying a print agent to a photoconductor to form a print agent pattern. In some examples, each print operation may comprise transferring the print agent pattern to an intermediate transfer member before transferring the pattern to the substrate. In other examples, the method may comprise arranging a substrate over the photoconductor and applying the print agent directly the substrate.

Block 106 comprises determining if the first and second scalings are different and, if so, block 108 comprises determining a control instruction to change the scan-to-scan spacing between the first and second print operations.

In some examples, the method may comprise carrying out the first and second print operations.

The scan-to-scan spacing may for example be determined as a separation of the centre line of the scans of light across the photoconductor. In some examples, the scans may be caused to overlap, while in other examples, the scans may have a space there between. In some examples, the scan-to-scan spacing may be determined as a separation, or a measure of a gap, or as a negative separation, or a measure of an overlap.

In some examples, the first and second scalings may be associated with a particular type of substrate, which may exhibit previously modelled behaviour. In some examples, one or more test prints may be carried out and analysed to determine if a substrate (which may be a particular type or batch of substrate) is liable to deform, to characterise the deformation and to determine a scaling which may compensate for the deformation. In this example, the scaling is based not just on the substrate but also on the separation as, as noted above, deformation may be progressive over a number of print separations. Therefore, in this example, a scaling is determined for each substrate and for each separation to be applied to the substrate. As is explained in greater detail below, by changing the scan-to-scan spacing, the overall height of a print agent pattern is changed. This may be controlled to match the scaling. In this way, substrates which may have been deemed impractical for multi-shot printing due to their deformation may be used with compensation for such deformation being provided by altering the scan-to-scan spacing between separations.

It may be impractical to change at least some print parameters between separations. For example vertical scaling issues may be addressed using an optical zoom, but such systems are relatively slow to react. However, in some examples, the placement with which light from each scan of the write head hits the photoconductive surface may relatively readily controlled, for example using dynamic mirrors which can be repositioned rapidly. Such dynamic mirrors may be moved throughout a selective charge dissipation operation. For example, such dynamic mirrors may be moved at an angular velocity which depends on the scaling applied to that separation. In order to correct for variations in, for example, a rotational velocity of a drum bearing a pattern receiving surface, the angular velocity may be changed while conducting a selective charge dissipation operation for a particular separation. Such control may be generally be carried out to provide consistent scan-to-scan spacing. However, in some examples set out herein, changing the scan-to-scan spacing may comprise controlling the angular velocity of such a mirror based on a 'per separation' determination of scaling.

Figure 2:
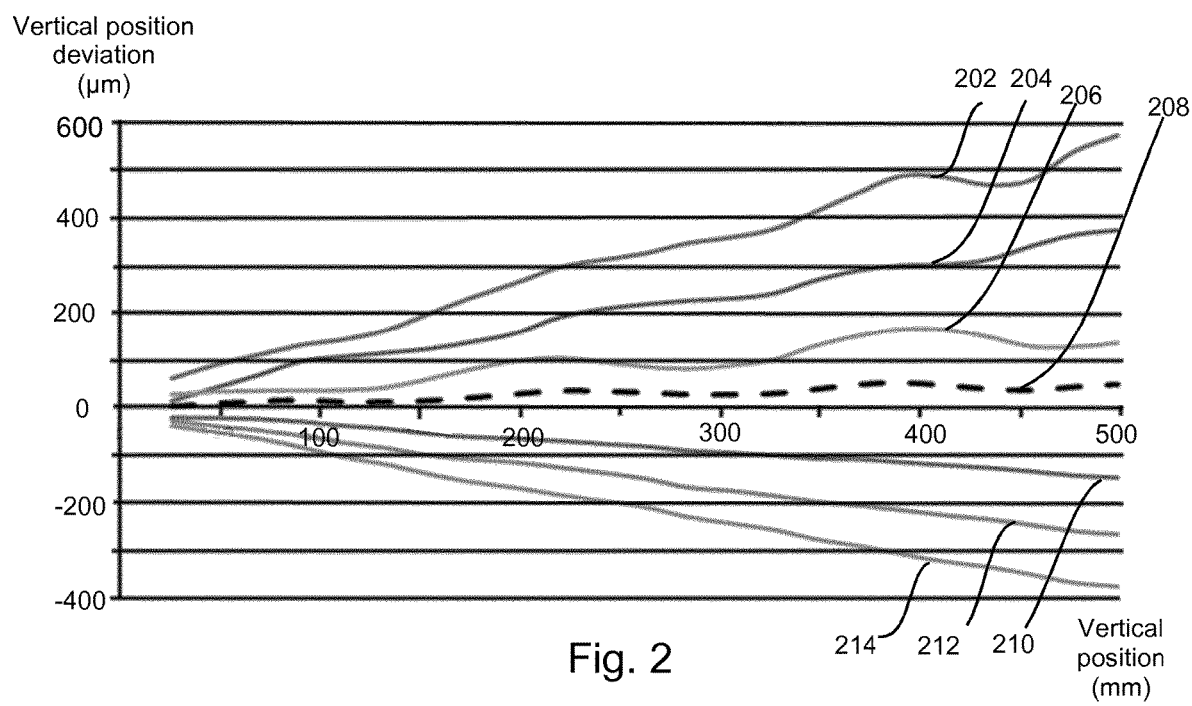
FIG. 2 is a graph showing example deformations of a substrate when printing a plurality of print separations.

FIG. 2 shows an example of substrate deformation, in this example in a '7-shot' printing mode on a synthetic substrate, in this example a polypropylene substrate. For each of the separations 202-214, the substrate is a different length, meaning the vertical position deviation to be applied to an image in order to maintain image registration between separations increases towards the end of the page. The deformation is shown relative to a black ink separation 208 (which is the middle, in this example, the fourth separation). In this case, the substrate is shrinking with each separation, resulting in an overall difference in length of almost 1000 µm. Examples of substrates which result in scaling changes of around +−800 µm (i.e. a change in length of 1600 µm) may be found.

Figure 3A:
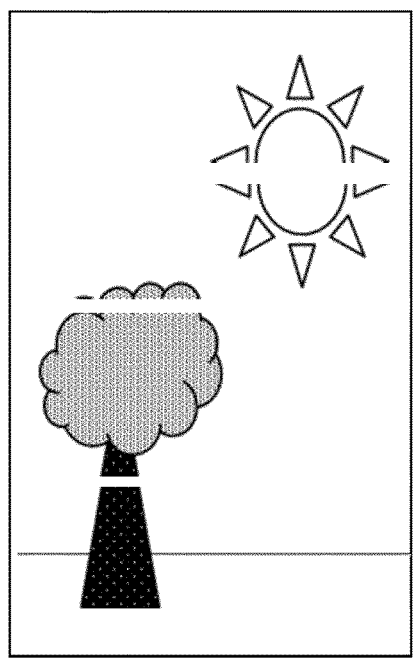
FIGS. 3A and 3B are examples of images comprising banding.

FIG. 3A shows an example of banding which may occur when a substrate is stretched. The image is interrupted in bands, leaving gaps. For the purpose of example, the gaps shown are large. In some examples, the gaps (and overlaps with reference to FIG. 3B) may be of the order of, or less than, microns. While this banding may be visible in the printed image, its origin lies in how the latent electrostatic image is written to the photoconductive surface. In this case, in order to compensate for the stretching, the optical path of the light may be altered such that, instead of scanning the light in swaths which stitch together precisely, a gap is provided between consecutive swaths. This can provide an overall image height which matches the height of a stretched substrate.

Where the gaps are small, this may be below human perception, and compensating for changes in scaling by varying scan-to-scan spacing may produce a high quality image. However, beyond a certain level, changes in scan-to-scan spacing may be perceptible in a printed image as banding. For example, a 700 µm scaling change along a 500 mm length substrate is a 0.14% scaling change. Assuming a scanning swath covers around is 875 µm, this will result in a spacing between swaths of around 1.2 µm, which is above the visibility threshold.

Figure 3B:
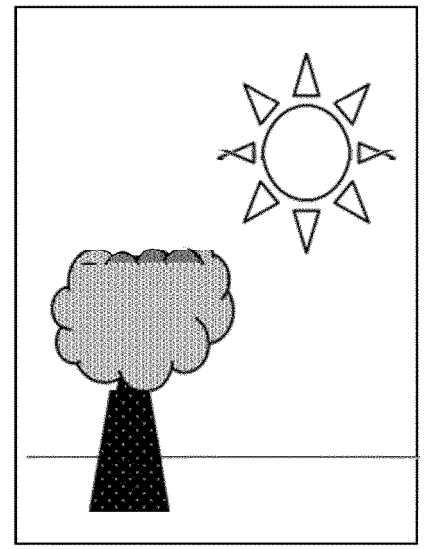

FIG. 3B shows an example in which the substrate has shrunk, and the scan-to-scan spacing has been reduced to match this to such an extent that there is an overlap between scans. Here, there is a band where scans of a write head overlap, and image portions are superimposed.

Such banding could for example be compensated for by optically spreading the light or focusing, for example with an optical zoom system. However, this may take time—for example, seconds—to perform, which may create impractical delays between print separations.

Figure 4:
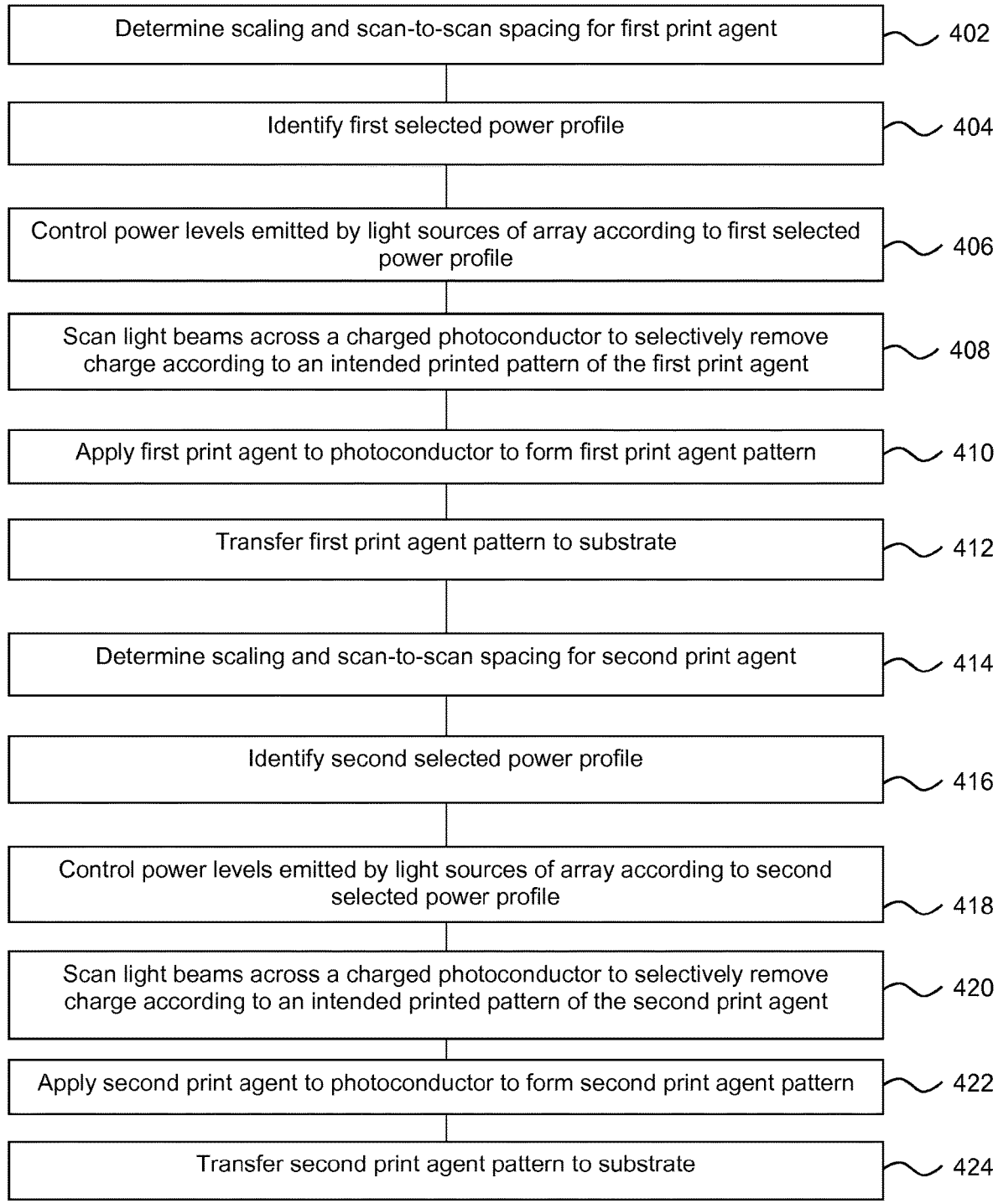
FIG. 4 is a flowchart of an example method of controlling power levels in a write head of a print apparatus.

FIG. 4 is an example of a method comprising, in block 402, determining a scaling and scan-to-scan spacing to be applied to a printed pattern of a first agent. In this example, the power levels emitted by the light sources may be controlled according to the determined scaling. In particular, the method may comprise controlling the power levels of light emitted by light sources of an array of light sources in a write head of a print apparatus such that light emitted by a first light source of the array is at a first power level and light emitted by a second light source of the array is at a second power level, wherein the first power level is different to the second power level.

The write head of a print apparatus (for example, a 'laser printer') is used to selective dissipate static charge on the photoconductive surface. It does this by selectively projecting 'dots' of light onto a charged surface where the surface is to be discharged. Light sources are switched on and off while the light is scanned across the photoconductive surface. The power level of the light may be associated with the size of a region in which light is dissipated. A higher power level means that a larger region of the photoconductive surface will have the charge dissipated therefrom than if a lower power level is used.

This may allow for at least partial compensation for an overlap or a gap between scans. For example, in the case of stretched substrates as discussed in relation to FIG. 3A, the light sources towards the edges of an array could operate at an increased power level when compared to those towards the middle of the array. Conversely, in the case of shrinking substrates as discussed in relation to FIG. 3B, the light sources towards the edges of an array could operate at a lower power level when compared to those towards the middle of the array.

In this example, once the scaling for the separation relating to the first print agent has been determined, in block 404, the method comprises identifying, based on the scaling, from a plurality of predetermined power profiles, a selected power profile.

The power profiles may for example control the power emitted from each light source based on its position in an array. For example, at least some of the profiles may control the power level of light emitted by each light source based on the distance from the centre of the array (or, equivalently, based on the distance from the ends of the array). In some examples, the array of light sources may comprise a linear array, or more generally light sources may be dispersed in a direction which is at least substantially orthogonal to the direction of travel of light therefrom across the photoconductive surface in the plane of the photoconductive surface. For example, if the scaling is negative (i.e. the substrate is liable to shrink), a power profile may be selected such that light levels reduce with distance from the centre of an array so as to reduce the power from any one scan operation in a region of overlap. Conversely, if the scaling is positive (i.e. the substrate is liable to stretch), a power profile may be selected such that light levels increase with distance from the centre of an array so as to increase the power in a region of a potential gap in the region of the photoconductive surface in which the charge is affected by a light source, reducing or eliminating any such gap. Selecting the profile may be based on the degree of deformation anticipated. For example, a 0.1% scaling may be associated with a first profile and a 0.2% scaling may be associated with a different profile.

In other examples, rather than being predetermined, the profiles may be generated, for example using a process which includes the scaling to be applied as a variable.

In some examples, the average power emitted by the array may be at least approximately constant in all the profiles available for selection or to be generated. This may allow print attributes such as color density to remain consistent when different power profiles are used for different separations or prints.

Block 406 comprises controlling the power levels emitted by the light sources of the array, in this example by applying a symmetrical ramped function across the array. The slope and/or direction of the ramp may be based on the scaling.

Block 408 comprises scanning beams from the array of light sources across a charged photoconductor to selectively remove charge from the charged photoconductor according to an intended printed pattern of the first print agent. This may comprise modulating the light sources between an 'on' state, in which they emit light at the intended nominal power level for that light source, and an 'off state', where no light is emitted. The light may therefore be controlled so as to strike the photoconductive surface at predetermined locations at which it is intended to dissipate charge, and not in other locations. In other examples, instead of being modulated between an on and off state, a light source may be selectively shuttered or the like. In some examples, there may be a plurality of predefined nominal power levels for a light source. For example, a light source may be established so as to be emit power based on a supply current, and there may be two, three, four or more predetermined supply current levels. The nominal current for each of these levels may be scaled according to a scaling factor based on a profile.

As noted above, a plurality of scans are carried out, each time passing light over an at least substantially different (in some cases, substantially parallel) swath of the photoconductor. The position of photoconductor or of the write head, and/or the optical path therebetween may be altered between scan operations such that each scan operation addresses a portion of the photoconductor which is at least substantially different from the portion addressed in another scan operation, and with a given scan-to-scan spacing.

Block 410 comprises applying the first print agent to the photoconductor to form a first print agent pattern. For example, a substantially uniform layer of an ink or toner may be supplied to the photoconductor and may adhere to any portion thereof where the charge has been dissipated. In other examples, a substrate may be arranged between a print agent source and the photoconductor, and the first print agent may be applied directly to the substrate.

Block 412 comprises transferring the first print agent pattern to a substrate. In some examples, the first print agent pattern may be transferred to an intermediate transfer member before being applied to a substrate.

Block 414 comprises determining a second scaling and scan-to-scan spacing to be applied to a printed pattern of a second print agent. For example, the second print agent may be a different color to the first print agent, or may comprise a transparent coating whereas the first print agent may comprise a color. In some examples the second print agent may be a second coating of the first print agent. Block 416 comprises identifying a second selected power profile. Block 418 comprises controlling the power levels emitted by each light source of an array of light sources according to the determined second scaling by applying the second selected power profile. Block 420 comprises scanning the beams from the array of light sources across the charged photoconductor to selectively remove charge from the charged photoconductor according to an intended printed pattern of the second print agent, as is described in relation to block 408 above. Block 422 comprises applying the second print agent to the photoconductor to form a second print agent pattern and block 424 comprises transferring the second print agent pattern to the substrate. Therefore, in summary, the first and second print agent is applied respectively as a first and second separation in a multi-shot printing mode, and the scan-to-scan spacing and power profile for printing the first separation is different to the scan-to-scan spacing and power profile for printing the second separation.

Figure 5:
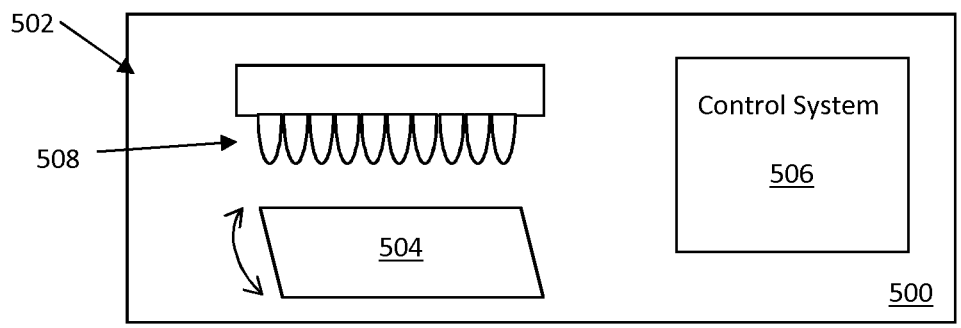
FIG. 5 is a diagram of example print apparatus laser scanning assembly.

FIG. 5 is an example of a print apparatus laser scanning assembly 500 comprising a write head 502, a movable mirror 504 and a control system 506. The write head 502 comprises a laser array 508, in this example a linear laser array, which in this example comprises laser diodes. While in this example, ten lasers are shown for the sake of example, in other examples, the laser array 508 may comprise around twenty lasers, thirty lasers, forty lasers or the like. These may be arranged in a single column, or in a plurality of columns. The moveable mirror 504 is to control the position of a scan of light from the write head 502 on a photoconductive surface of a printer.

In some examples, the moveable mirror 504 may be a relatively small, or micro mirror of around 1 cm in length and height. In other examples, the mirror 504 may be larger, for example around 35 cm in length, or around the length/width of a photoconductive surface. The control system 506 is configured to determine a scaling to be applied to each separation of printed image to control the moveable mirror such to have a scan-to-scan spacing depending on the scaling of a separation being printed. In some examples, the control system 506 is configured to determine a power level of light to be emitted by each laser of a laser array according to the determined scaling. In some such examples, the control system 506 is configured to determine the power level of light emitted by each laser based on a function which varies according to the distance of the laser from the centre of the column. In use of the apparatus, the control system 506 may control the power of light emitted by each laser according to the determination.

In some examples, the scaling may be supplied by a user, or may be determined for example on the basis of a lookup table once the substrate has been identified. In some examples, tests may be carried out to determine the scaling.

In some examples, the print apparatus laser scanning assembly 500 may comprise optical components such as lenses, light directing apparatus such as additional mirrors (which may be multifaceted mirrors, micro mirrors, planar mirrors or the like, and may be moveably mounted), scanning apparatus to move the assembly and/or a component thereof, motors or other actuators, and the like.

Figure 6A:
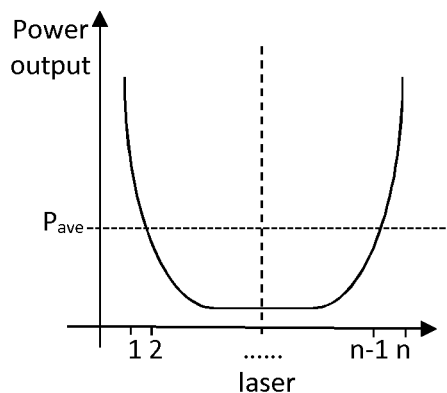
FIGS. 6A and 6B are examples of power profiles.
Figure 6B:
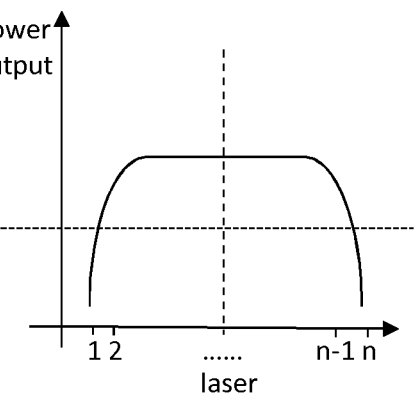

For example, FIG. 6A shows a first power profile which may be applied across an array of n lasers, which are arranged in a write head in a line or column from laser 1 to laser n, for positive scaling, i.e. the substrate tends to stretch. The power level of light emitted by the lasers towards the edges of the array (e.g. lasers 1, 2, n−1 and n) is higher than the power level of light emitted by the lasers towards the centre of the array (marked with a dotted line). Thus, in this example, the power level of light emitted by the lasers tends to increase with distance from the centre of the column (although such an increase does not apply in a central portion of the array). FIG. 6B shows a second power profile which may be applied across the array for a negative scaling, i.e. the substrate tends to shrink. The power level of light emitted by the lasers towards the edges of the array is lower than the power level of light emitted by the lasers towards the centre. In both examples, the average power of the light emitted across the array, $P_{ave}$, is the same. More generally, some examples, the control system 506 may be arranged to control the average power level of light emitted by the laser array to be a common value regardless of the scaling. In some examples, the control system 506 may receive, or otherwise have access to, one or a plurality of predetermined power profiles. In other examples, the control system 506 may comprises processing circuitry to determine a power profile based on the scaling.

In each of the examples of FIGS. 6A and 6B, a substantially parabolic function is used, with a substantially constant power level being applied to central lasers. Such a function allows redefinition of the edges of a scan performed by the write head while not unduly impacting the power level across the centre portion of the scan, which may promote color consistency between the differently scaled print operations. In some examples, the function may be a smoothly varying function as smooth changes are less likely to be perceptible to a viewer in the printed image. In other examples, a linear function, which may apply over all or just part(s) of the array may provide a power profile, a different parabolic function or some other curved function may be applied to all or part of the array 508. In some examples, the power profile may be symmetrical but this need not be the case: any gap or overlap could be addressed at one edge of a scan operation and not at the other.

Figure 7:
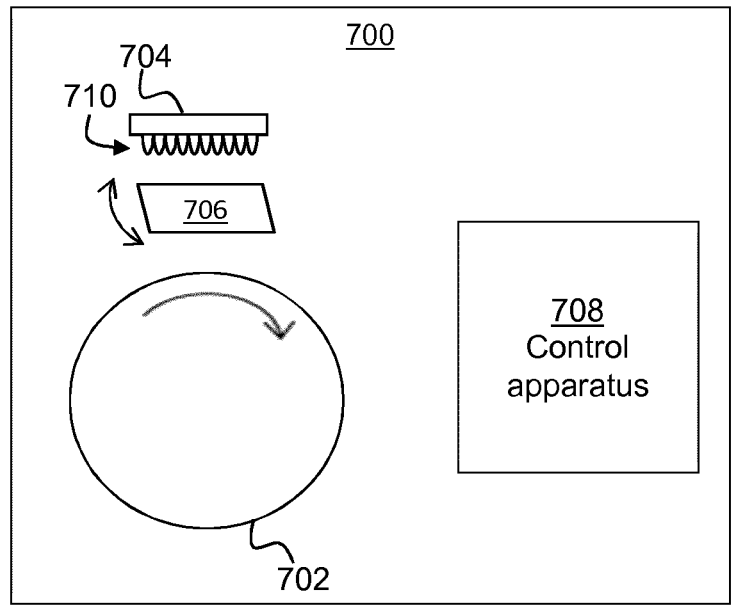
FIGS. 7 and 8 are diagrams of example print apparatus.

FIG. 7 is an example of a print apparatus 700 comprising a photoconductor 702, a write head 704, a moveable mirror 706 and control apparatus 708.

In this example, the photoconductor 702 is curved around a rotating drum. The write head 704 is arranged to selectively remove charge from the photoconductor 702 according to a predetermined pattern and comprises a plurality of light sources 710 to emit light towards the photoconductor 702. The moveable mirror 706 is adapted to control the position of a scan of light from the write head 704 on the photoconductor 702. In some examples, the write head 704 may have any of the features discussed in relation to the write head 502 of FIG. 5.

A scan operation may be carried out, in which light from the write head 704 is reflected from the moveable mirror 706 and swept across the length of the drum (for example by a fast moving, multifaceted mirror). In such a scan operation, each light source 710 may be selectively controlled on and off to discharge charges in a scan line. The drum may then rotate to present at least a substantially fully charged portion of the photoconductor 702 for a subsequent scan operation, and this process may continue until a latent electrostatic pattern is fully written to the photoconductor.

The control apparatus 708 is configured to control the moveable mirror so as to provide a scan-to-scan spacing which is dependent on a scaling associated with a separation being printed. The control apparatus 708 is also configured to control the power levels emitted by the light sources 710 so as to vary a size of a region of the photoconductor 702 from which charge is removed thereby such that the size of a region of the photoconductor 702 from which charge is removed by a first light source is different to the size of a region of the photoconductor 702 from which charge is removed by a second light source. As has been noted above, the size of the region may be related to the power of light emitted by a light source. The control apparatus 708 may control the power levels to be same for each of a plurality of scan operations (for example until the latent electrostatic pattern for one separation has been formed), or different power levels may be used for different scan operations (i.e. different 'sweeps' of the surface of the drum).

Figure 8:
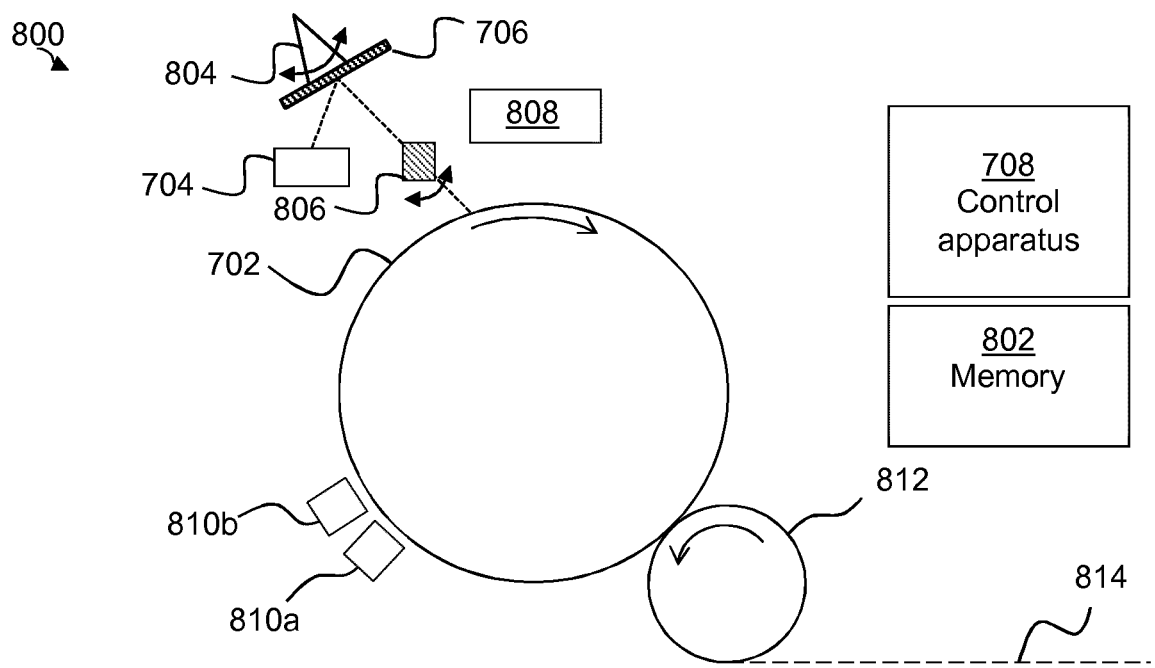

FIG. 8 shows another example of a print apparatus 800. In addition to the components described in relation to FIG. 7 above, which are labelled with like numbers, the print apparatus 800 further comprises a memory 802, which stores a plurality of predetermined power level profiles. In this example, each of the predetermined power profiles comprises a common average power value.

The print apparatus 800 further comprises a moveable mounting 804 to adjust the optical path between the write head 704 and the photoconductor 702 and to control the scan-to-scan spacing, and the control apparatus 708 is to control the power levels emitted by the light sources 710 to compensate for an adjustment in the optical path. In this example, the moveable mounting 804 is a mounting for a moveable mirror 706, which changes the angle at which light strikes the photoconductor during a scan thereof, allowing for the overall length of the photoconductor to be addressed in building up a latent electrostatic image to be tailored to the scaling applied to the image. For example, the mounting 804 may comprise at least one motor, in some examples a galvo motor. The length of the scan may be provided by a fast moving mirror 806, which moves fast relative to the other components. In such a way, while the centre line of a scan is determined according to the placement of the moveable mirror 706, the length of the scan is provided by the fast moving mirror 806 (which may for example comprise a spinning multifaceted, or polygon) mirror. The length of the scan may be determined by optical system aperture(s) and/or by the dimensions of the polygon facets.

The print apparatus 800 further comprises a photo charging unit 808, a plurality of print agent sources 810*a-b* and an intermediate transfer member 812.

In this example, the print apparatus 800 is a Liquid Electro Photographic (LEP) printing apparatus which may be used to print a print agent such as an electrostatic ink composition (or more generally, an electronic ink). The photo charging unit 808 deposits a substantially uniform static charge on the photoconductor 702, which in this example is a photo imaging plate, or 'PIP' and the write head 704 dissipates the static charges in selected portions of the image area on the PIP to leave a latent electrostatic image over a number of scan operations, or sweeps. The latent electrostatic image is an electrostatic charge pattern representing the pattern to be printed. The electrostatic ink composition is then transferred to the PIP from a print agent source 810a-b, which may comprise a Binary Ink Developer (BID) unit, and which may present a substantially uniform film of the print agent to the PIP. A resin component of the print agent may be electrically charged by virtue of an appropriate potential applied to the print agent in the print agent source 810a-b. The charged resin component, by virtue of an appropriate potential on the electrostatic image areas, is attracted to the latent electrostatic image on the PIP. The print agent does not adhere to the charged, non-image areas and forms an image on the surface of the latent electrostatic image. The photoconductor 702 will thereby acquire a developed print agent electrostatic ink composition pattern on its surface.

The pattern is then transferred from the intermediate transfer member 812, by virtue of an appropriate potential applied between the photoconductor 702 and the intermediate transfer member 812 such that the charged print agent is attracted to the intermediate transfer member 812. The print agent pattern may then be dried and fused on the intermediate transfer member 812 before being transferred to the print media sheet 814 (for example, adhering to the colder surface thereof). In some examples, the intermediate transfer member 812 is heated.

Figure 9A:
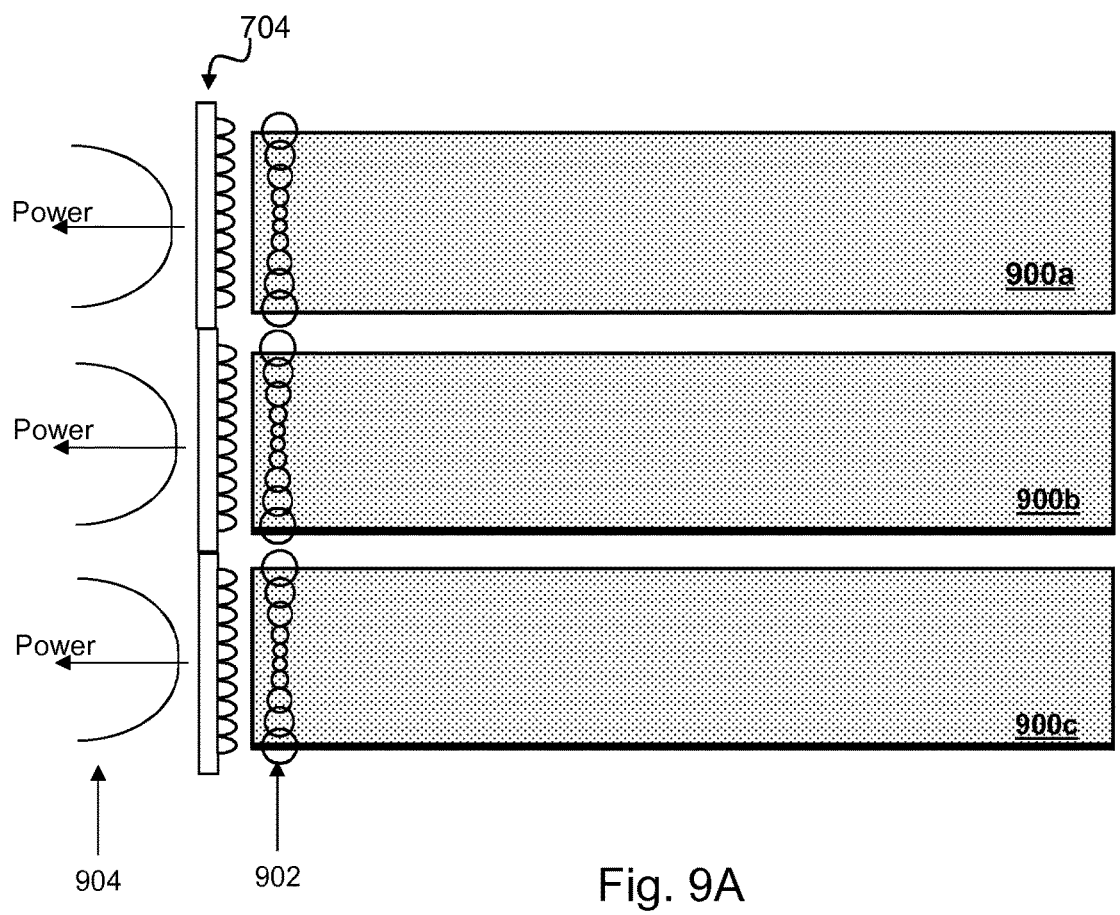
FIGS. 9A and 9B are examples of applying power level control to printing swaths.
Figure 9B:
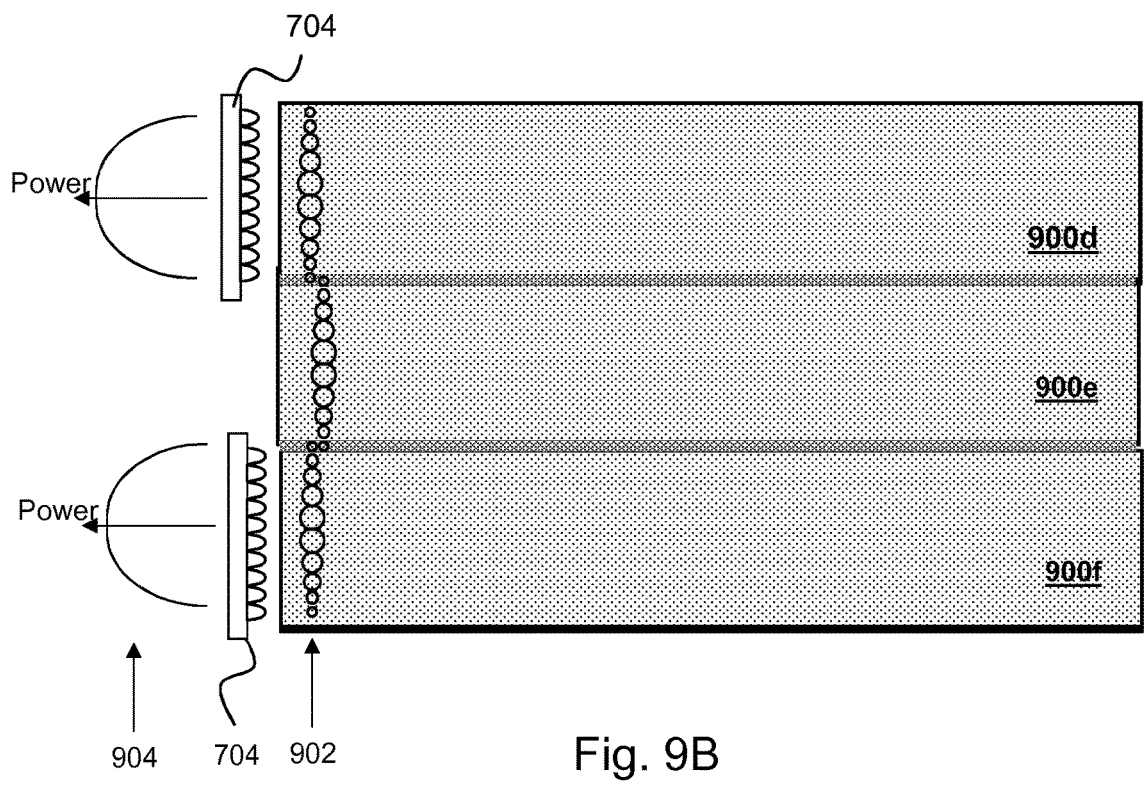

In this example, the write head 704 is arranged to selectively remove charge from the photoconductor in a plurality of scans, or sweeps, thereof, each time emitting light to strike the photoconductor in one of a plurality of swaths. Each light source 710 of the array is arranged to selectively remove charge in a linear region along the length of the swath which lies at least substantially between two outer edges of the swath. In a practical example, there may be hundreds of such swaths formed in order to build up a latent electrostatic image. In the case where no scaling is applied and/or an optical zoom is correctly determined, the scans may stitch together with no gaps and no overlaps. However, FIG. 9a shows an example in which there are gaps between the scans 900a-c (positive scaling is applied) and FIG. 9b shows and example in which there are overlaps between the scans 900d-f (negative scaling is applied). In some examples, the gaps/overlaps may occupy a region in the order of microns. In the example of FIG. 8, where the photoconductor 702 is provided about a drum, the scans may comprise strips of the outer surface of the drum which are parallel to the longitudinal axis of the drum. Between scans, the drum advances so as to present a new region of the surface. In this example, each scan is made with light from the same write head 704 although there may be more than one write head 704.

Superimposed on the scans 900a-f are spots 902 having a size indicative (albeit not to scale) of the size of a region of the photoconductor 702 which is affected by the light from a light source. In this example, the power level of the light sources is controlled according to a ramped function 904 which varies with distance from the outer edges of the swath, and according to the scaling applied. As can be seen, in FIG. 9B, the region of the photoconductor affected by the light sources becomes larger towards the outer edges of the scans 900a-c, whereas in FIG. 9B, becomes smaller. In FIG. 9B, scan 900e is carried out in the same way as scans 900d and 900f: the write head 704 and function 904 are omitted from the figure for the sake of clarity.

As is illustrated in these figures, size of a region of the photoconductor 702 from which charge is removed by a first light source (e.g. a spot corresponding to a light source at the centre of an array) is different to the size of a region of the photoconductor 702 from which charge is removed by a second light source 710 (e.g. a spot corresponding to a light source at the end of an array).

Aspects of some examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that at least one flow in the flow charts, as well as combinations of the flows in the flow charts can be realized by machine readable instructions.

The machine readable instructions may, for example, be executed by a general purpose computer, a special purpose computer, an embedded processor or processors of other programmable data processing devices to realize the functions described in the description and diagrams, and which may for example comprises at least part of the control system 506 or the control apparatus 708. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
   determining a first scaling to be applied to a first print operation, the first print operation comprising selectively removing charge from a charged photoconductor by irradiating the charged photoconductor in a plurality of scans during the first print operation, forming a first print pattern on the charged photoconductor and delivering the first print pattern to a substrate;
   determining a second scaling to be applied to a second print operation, the second print operation comprising selectively removing the charge from the charged photoconductor by irradiating the charged photoconductor in a plurality of scans during the second print operation, forming a second print pattern on the charged photoconductor and delivering the second print pattern to the substrate; and
   if the first and second scalings are different, determining a control instruction to change a scan-to-scan spacing between the first and second print operations.

2. The method according to claim 1, further comprising:
   for the first print operation, controlling power levels of light emitted by light sources of an array of light sources in a write head of a print apparatus according to the first scaling such that light emitted by a first light source of the array is at a first power level and light emitted by a second light source of the array is at a second power level, wherein the first power level is different to the second power level.

3. The method according to claim 2, wherein controlling the power levels of light emitted by the light sources of the array comprises determining the power levels of the light sources based on positions of the light sources within the array.

4. The method according to claim 2, wherein controlling the power levels of light emitted by the light sources of the array comprises:
   identifying, based on the first scaling to be applied to the first print pattern, from a plurality of predetermined power profiles, a selected power profile; and
   applying the selected power profile to the array.

5. The method according to claim 2, wherein controlling the power levels of light emitted by the light sources of the array comprises controlling the power levels according a first power profile for printing a first print separation and controlling the power levels according a second power profile for printing a second print separation.

6. The method according to claim 1, further comprising scanning beams from an array of light sources across the charged photoconductor to selectively remove the charge from the charged photoconductor according to an intended printed pattern of a print agent.

7. The method according to claim 1, further comprising:
   controlling a power level emitted by each light source of an array of light sources according to the first scaling;
   scanning beams from the array of light sources across the charged photoconductor to selectively remove the charge from the charged photoconductor according to an intended printed pattern of a first print agent, wherein each scan has a first spacing from an adjacent scan;
   applying the first print agent to the charged photoconductor to form the first print pattern;
   transferring the first print pattern to the substrate;
   controlling the power level emitted by each light source of the array of light sources according to the second scaling;
   scanning beams from the array of light sources across the charged photoconductor to selectively remove the charge from the charged photoconductor according to an intended printed pattern of a second print agent, wherein each scan has a second spacing from an adjacent scan;
   applying the second print agent to the charged photoconductor to form the second print pattern; and
   transferring the second print pattern to the substrate.

8. A print apparatus laser scanning assembly comprising:
   a write head comprising an array of light sources;
   a moveable mirror, wherein the moveable mirror is to control a position of a scan of light from the write head on a photoconductive surface of a printer;
   a control system, wherein the control system is to:
      determine a scaling to be applied to each separation of printed image;
      control the moveable mirror to provide a scan-to-scan spacing dependent on the scaling of each separation; and
      control power levels of light emitted from the light sources of the array in the write head according to the scaling such that light emitted by a first light source of the array is at a first power level and light emitted by a second light source of the array is at a second power level, wherein the first power level is different to the second power level.

9. The print apparatus laser scanning assembly of claim 8, wherein, to control the power levels of light emitted from the light sources of the array, the control system is to determine a power level of light emitted by each light source of the array based on a function which varies according to a distance of the respective light source from a center of the array.

10. A print apparatus comprising:
    a photoconductor;
    a write head comprising light sources to emit light towards the photoconductor, wherein the light sources are to selectively remove charge from the photoconductor according to a predetermined pattern;
    a moveable mirror, wherein the moveable mirror is to control a position of a scan of light from the write head on the photoconductor; and
    control apparatus, wherein the control apparatus is to control the moveable mirror to provide a scan-to-scan spacing which is dependent on a scaling associated with a separation being printed.

11. The print apparatus according to claim 10, wherein the control apparatus is further to control power levels emitted by the light sources to vary a size of a region of the photoconductor from which the charge is removed, and wherein the size of the region of the photoconductor from which the charge is removed by a first light source is different to the size of the region of the photoconductor from which the charge is removed by a second light source.

12. The print apparatus according to claim 11, wherein the light sources are to emit the light toward the photoconductor to selectively remove the charge in a linear region along a length of a swath, the length of the swath being defined between two outer edges, and wherein the control apparatus is further to control the power levels of the light sources according to a ramped function which varies with a distance from the outer edges of the swath.

13. The print apparatus according to claim 10, further comprising a memory to store predetermined power level profiles, wherein at least two of the predetermined power profiles comprise a common average power value.

14. The print apparatus according to claim 10, wherein the print apparatus further comprises at least one moveable mounting to adjust the position of the moveable mirror, and the control apparatus is to control power levels emitted by the light sources to compensate for an adjustment in the position of the moveable mirror.

15. The print apparatus according to claim 10, wherein the light sources are to selectively emit the light on a first swath of the photoconductor in a first scan and on a second swath of the photoconductor in a second scan.

* * * * *